(12) United States Patent
Gauerhof et al.

(10) Patent No.: US 12,100,197 B2
(45) Date of Patent: *Sep. 24, 2024

(54) METHOD AND DEVICE FOR TRAINING A MACHINE LEARNING SYSTEM

(71) Applicant: Robert Bosch GmbH, Stuttgart (DE)

(72) Inventors: Lydia Gauerhof, Sindelfingen (DE); Nianlong Gu, Wettingen (CH)

(73) Assignee: ROBERT BOSCH GMBH, Stuttgart (DE)

(*) Notice: Subject to any disclaimer, the term of this patent is extended or adjusted under 35 U.S.C. 154(b) by 398 days.

This patent is subject to a terminal disclaimer.

(21) Appl. No.: 17/610,669

(22) PCT Filed: Jun. 10, 2020

(86) PCT No.: PCT/EP2020/066033
§ 371 (c)(1),
(2) Date: Nov. 11, 2021

(87) PCT Pub. No.: WO2020/260016
PCT Pub. Date: Dec. 30, 2020

(65) Prior Publication Data
US 2022/0245932 A1    Aug. 4, 2022

(30) Foreign Application Priority Data

Jun. 28, 2019   (DE) .................. 10 2019 209 566.6

(51) Int. Cl.
*G06V 10/82*   (2022.01)
*G06N 3/045*   (2023.01)
(Continued)

(52) U.S. Cl.
CPC ............. *G06V 10/82* (2022.01); *G06N 3/045* (2023.01); *G06N 3/088* (2013.01); *G06V 10/764* (2022.01)

(58) Field of Classification Search
CPC ...... G06V 10/82; G06V 10/764; G06N 3/045; G06N 3/088
See application file for complete search history.

(56) References Cited

U.S. PATENT DOCUMENTS

2020/0401900 A1* 12/2020 Lee .................... G06N 3/04

OTHER PUBLICATIONS

Larsen, Anders Boesen Lindbo, et al. "Autoencoding beyond pixels using a learned similarity metric." International conference on machine learning. PMLR, 2016. https://arxiv.org/abs/1512.09300 (Year: 2016).*

(Continued)

*Primary Examiner* — Matthew C Bella
*Assistant Examiner* — Andrew B. Jones
(74) *Attorney, Agent, or Firm* — NORTON ROSE FULBRIGHT US LLP; Gerard A. Messina (57) ABSTRACT

A method for training a machine learning system. The method includes generating an augmented dataset including input images for training the machine learning system, which is for classification and/or semantic segmentation of input images, using a first machine learning system, which is embodied as a decoder of an autoencoder, and a second machine learning system, which is embodied as an encoder of the autoencoder. Latent variables are ascertained from the input images using the encoder. The input images are classified as a function of ascertained feature characteristics of their image data. An augmented input image of the augmented dataset is ascertained from at least one of the input images as a function of average values of the ascertained latent variables in at least two of the classes. The image classes are selected so that the input images classified therein agree in their characteristics in a predefinable set of other features.

14 Claims, 11 Drawing Sheets

(51) Int. Cl.
  *G06N 3/088* (2023.01)
  *G06V 10/764* (2022.01)

(56) References Cited

OTHER PUBLICATIONS

J. Choe, "Face Generation for Low-Shot Learning Using Generative Adversarial Networks," 2017 IEEE International Conference on Computer Vision Workshops (ICCVW), Venice, Italy, 2017, pp. 1940-1948, doi: 10.1109/ICCVW.2017.229. https://ieeexplore.IEEE.org/document/8265439 (Year: 2017).*

International Search Report for PCT/EP2020/066033, Issued Sep. 3, 2020.

Bao et al., "CVAE-GAN: Fine-Grained Image Generation Through Asymmetric Training," Cornell University, 2017, pp. 1-10. <https://arxiv.org/pdf/1703.10155.pdf> Downloaded Nov. 11, 2021.

Larsen et al., "Autoencoding Beyond Pixels Using a Learned Similarity Metric," Proceedings of the 33rd International Conference On Machine Learning, New York, NY, USA, JMLR: W&CP, vol. 48, 2016, pp. 1-9.

Choe et al., "Face Generation for Low-Shot Learning Using Generative Adversarial Networks," 2017 IEEE International Conference On Computer Vision Workshops (ICCVW), IEEE, 2017, pp. 1940-1948.

* cited by examiner

METHOD AND DEVICE FOR TRAINING A MACHINE LEARNING SYSTEM

FIELD

The present method relates to a method for training a machine learning system, to a training device, a computer program and a machine-readable memory medium.

BACKGROUND INFORMATION

"CVAE-GAN: Fine-Grained Image Generation through Asymmetric Training", arXiv preprint arXiv: 1703.10155, 2017, Jianmin Bao, Dong Chen, Fang Wen, Houqiang Li, and Gang Hua provides an overview of conventional generative methods such as variational autoencoders and generative adversarial networks.

SUMMARY

Example embodiments of the present invention may have the advantage that a particularly well augmented dataset is able to be made available. This is possible because features of the images in the space of the latent variable (latent space) are able to be analyzed particularly well and disentangled features can be extracted so that an especially selective variation of the features of the images is possible in the described procedure.

Additional aspects of the present invention are disclosed herein. Advantageous further refinements disclosed herein.

According to a first aspect, the present invention relates to a computer-implemented method for generating an augmented dataset which includes input images for training a machine learning system that is designed for the classification and/or semantic segmentation of input images, using a first machine learning system, which is embodied as a decoder of an autoencoder, in particular a first neural network, and a second machine learning system, in particular a second neural network, which is embodied as an encoder of the autoencoder, and latent variables are ascertained from the input images with the aid of the encoder, the input images being classified as a function of ascertained feature characteristics of their image data, and an augmented input image of the augmented dataset is ascertained from at least one of the input images as a function of average values of the ascertained latent variables in at least two of the classes, the image classes being selected in such a way that the input images classified therein agree in their characteristics in a predefined set of other features.

In this context, it may then advantageously be provided that the augmented input image be ascertained with the aid of the decoder as a function of an ascertained augmented latent variable. On that basis, a modified image is able to be generated in an efficient manner.

In accordance with an example embodiment of the present invention, to modify a predefined feature of an existing image in a particularly selective manner, it may be provided that the augmented latent variable be ascertained from a predefined one of the ascertained latent variables and a difference of the average values. On that basis, the feature of the image that corresponds to the predefined one of the ascertained latent variables is varied.

In order to obtain the greatest possible number of new feature characteristics, it may be provided to weight the difference by a predefined weighting factor α. This in particular makes it possible to generate a multitude of training images whose features vary to different degrees.

For street scenes, for instance, it is possible to vary the visual attributes of pedestrians in a multitude of characteristics and thus provide a particularly large training or test dataset, which ensures a very high coverage with regard to this feature.

In a further refinement of the present invention, it may be provided that a check be carried out with the aid of the generated augmented dataset as to whether the particularly already trained machine learning system is robust, and as a function thereof, the training then is continued, in particular is continued only if the check has revealed that the machine learning system is not robust. This makes it possible to check in a particularly reliable manner whether the machine learning system is robust with regard to the varied feature.

Alternatively or additionally, it may be provided that the machine learning then is trained by the generated augmented data set, especially is trained only if the monitoring has revealed that the machine learning system is not robust.

In a further refinement of this aspect of the present invention, it may be provided that monitoring of the machine learning system be carried out with the aid of a monitoring unit, which includes the first machine learning system and the second machine learning system, the input image being conveyed to the second machine learning system, which uses it to ascertain a low-dimensional latent variable, from which the first machine learning system ascertains a reconstruction of the input image, whereupon a decision is made as to whether or not the machine learning system is robust as a function of the input image and the reconstructed input image.

In a further refinement of this aspect of the present invention, it may be provided that the monitoring unit also has a third machine learning system of a neural network system, the neural network system including the first machine learning system, the second machine learning system and a third machine learning system, in particular a third neural network, and the first machine learning system is designed to ascertain from a predefined, low-dimensional latent variable a higher-dimensional, constructed image, and the second machine learning system is designed to ascertain the latent variable from the higher-dimensional, constructed image again, and the third machine learning system is designed to distinguish whether or not an image that it has received is a real image, a decision being made as a function thereof as to whether or not the machine learning system is robust, which value the one activation in the predefined feature map of the third machine learning system assumes when it receives the input image, and which value the activation in the predefined feature map of the third machine learning system assumes when it receives the reconstructed input image.

In this context, it may be provided that the first machine learning system be trained to the effect that an activation in a predefined feature map of the feature maps of the third machine learning system ideally assumes the same value when it receives a real image or an image of the real image that is reconstructed from a series connection made up of the second machine learning system and the first machine learning system.

It has been shown that this makes it possible for the training to converge in a particularly satisfactory manner.

In a further refinement of this aspect of the present invention, it may be provided that the first machine learning system be trained also to the effect that the third machine learning system ideally does not recognize that an image it receives which was generated by the first machine learning system and conveyed to the third machine learning system is not a real image. This ensures a particularly robust anomaly detection.

Alternatively or additionally, it may be provided that the second machine learning system, and especially only the second machine learning system, be trained to the effect that a reconstruction of the latent variable ascertained by a series connection made up of the first machine learning system and the second machine learning system is as similar as possible to the latent variable. It was recognized that the convergence of the method is considerably improved when this reconstruction is selected so that only the parameters of the second machine learning system are trained since the cost function of the encoder and the generator are otherwise difficult to be brought in line with each other.

In order to achieve the best possible improvement in the training result, in a further refinement it may be provided that the third machine learning system be trained to the effect that it ideally recognizes that an image it has received that was generated by the first machine learning system is no real image and/or that the third machine learning system be trained also to the effect that it ideally recognizes that an image it has received is a real image.

If the machine learning system and the neural network are trained using datasets that include the same input images, then the monitoring is particularly reliable since it is ensured in an especially uncomplicated manner that the statistical distributions of the training datasets are comparable (i.e., identical).

In further aspects, the present invention relates to a computer program which is designed to execute the above methods, and to a machine-readable memory medium on which this computer program is stored.

Hereinafter, embodiments of the present invention will be described in greater detail with reference to the figures.

DETAILED DESCRIPTION OF EXAMPLE EMBODIMENTS

Figure 1:
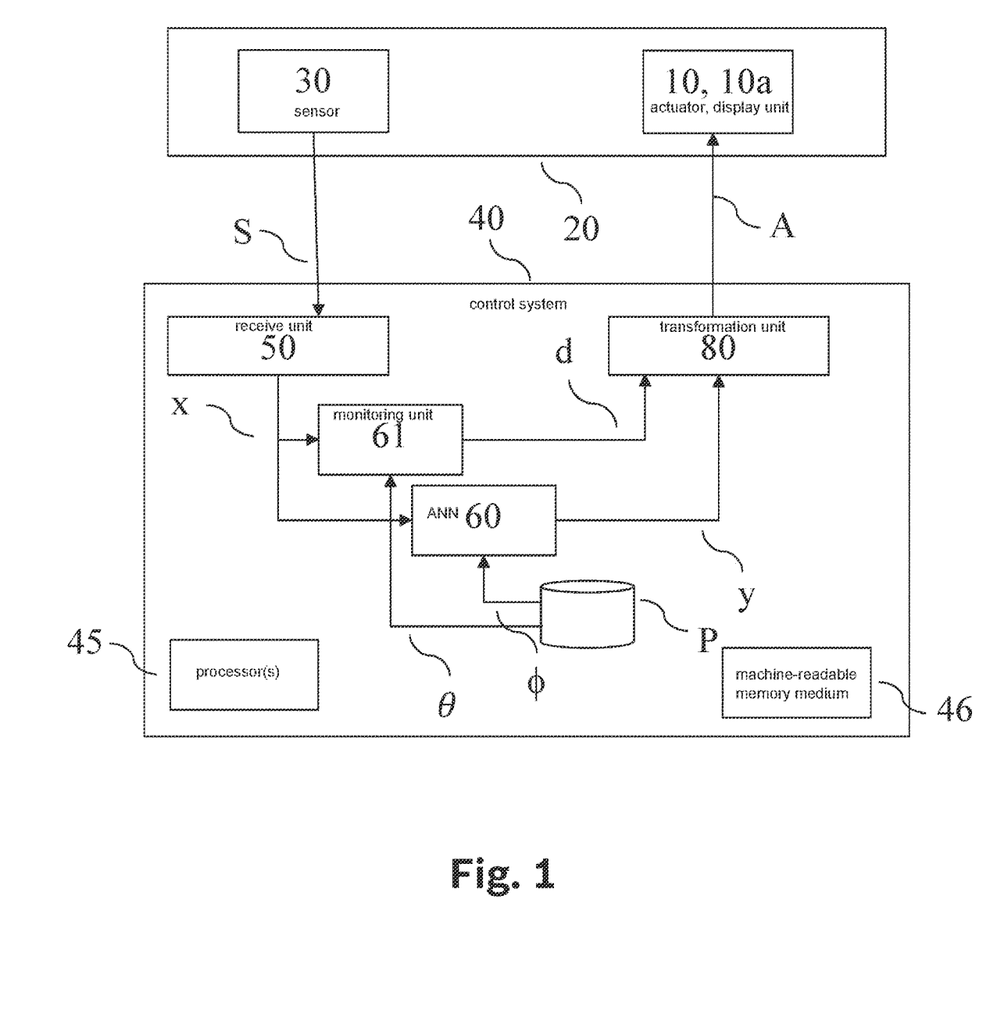
FIG. 1 shows schematically, a structure of one embodiment of the present invention.

FIG. 1 shows an actuator 10 in its environment 20 in an interaction with a control system 40. At preferably regular time intervals, environment 20 is acquired in a sensor 30, in particular an imaging sensor such as a video sensor, which may also be present as a plurality of sensors, e.g., a stereo camera. Other imaging sensors such as radar, ultrasound or lidar are also conceivable. A thermal imaging camera is another option. Sensor signal S—or an individual sensor signal S in the case of multiple sensors—of sensor 30 is transmitted to control system 40. Control system 40 thus receives a sequence of sensor signals S. On that basis, control system 40 ascertains actuation signal A, which is transmitted to actuator 10.

Control system 40 receives the sequence of sensor signals S from sensor 30 in an optional receive unit 50, which converts the sequence of sensor signals into a sequence of input images x (a direct adoption of sensor signal S as input image x is possible as an alternative). Input image x, for example, may be a cutout or a further processing of sensor signal S. Input image x includes individual frames of a video recording. in other words, input image x is ascertained as a function of sensor signal S. The sequence of input images x is conveyed to a machine learning system, which is an artificial neural network 60 in the exemplary embodiment.

Artificial neural network 60 is preferably parameterized by parameters $\phi$, which are stored in a parameter memory P and supplyable by this memory.

Artificial neural network 60 ascertains output variables y from input images x. These output variables y may particularly include a classification and/or a semantic segmentation of input images x. Output variables y are conveyed to an optional transformation unit 80, which uses them to ascertain actuation signals A, which are conveyed to actuator 10 in order to actuate actuator 10 appropriately. Output variable y includes information about objects that were detected by sensor 30.

Control system 40 furthermore includes a monitoring unit 61 for monitoring the mode of operation of artificial neural network 60. Input image x is also conveyed to monitoring unit 61. It ascertains a monitoring signal d as a function thereof, which is likewise conveyed to transformation unit 80. Actuation signal A is also ascertained as a function of monitoring signal d.

Monitoring signal d characterizes whether or not neural network 60 reliably ascertains output variables y. If monitoring signal d characterizes an unreliability, it may be provided, for instance, that actuation signal A is ascertained according to a protected operating mode (while it is otherwise ascertained in a normal operating mode). The protected operating mode, for instance, may include a reduction of dynamics of actuator 10 or that functionalities for actuating actuator 10 are switched off.

Actuator 10 receives actuation signals A, is actuated accordingly and carries out a corresponding action. Actuator 10 may include a (not necessarily structurally integrated) actuation logic, which ascertains a second actuation signal from actuation signal A by which actuator 10 then is actuated.

In further embodiments, control system 40 includes sensor 30. In still further embodiments, control system 40 alternatively or additionally also includes actuator 10.

In further preferred embodiments, control system 40 includes a single processor 45 or a plurality of processors 45 and at least one machine-readable memory medium 46 on which instructions are stored that induce control system 40 to carry out the method according to the present invention when the instructions are executed on processors 45.

In alternative embodiments, a display unit 10a is provided as an alternative or in addition to actuator 10.

Figure 2:
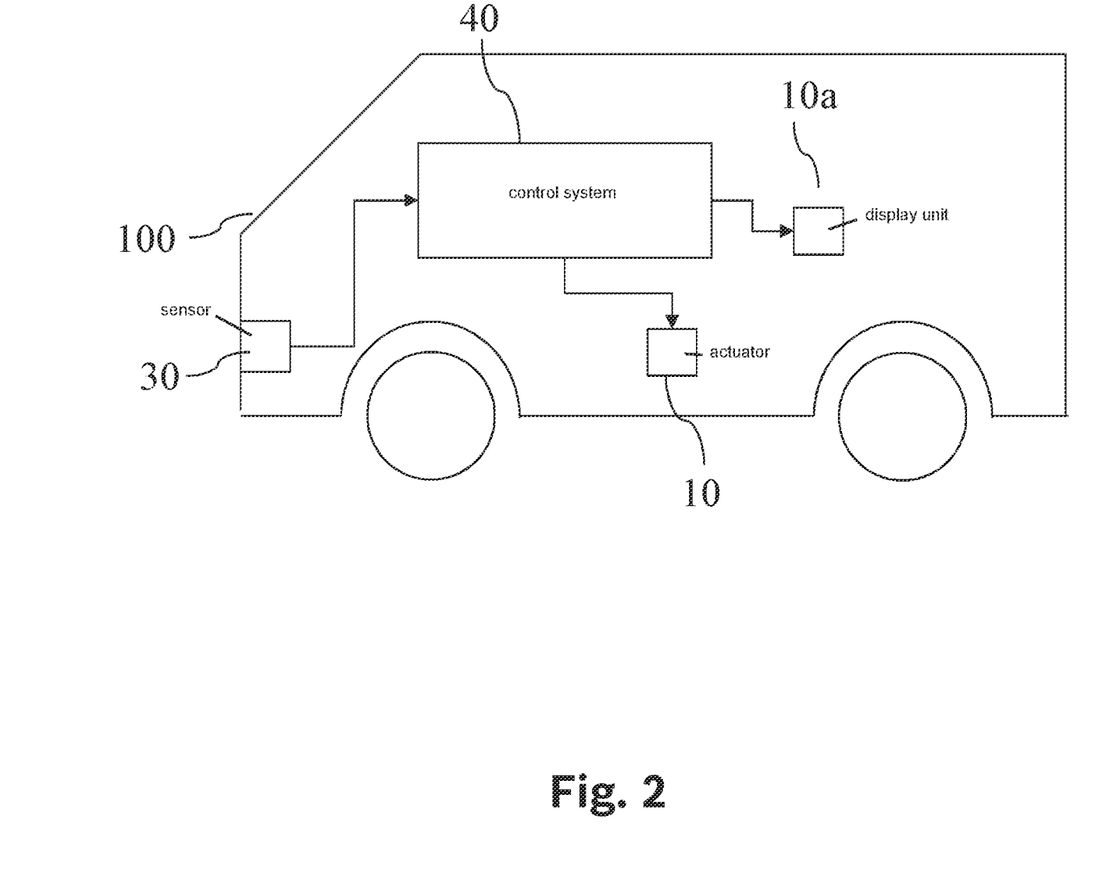
FIG. 2 shows schematically, an exemplary embodiment for the control of an at least semiautonomous robot.

FIG. 2 shows the way in which control system 40 is able to be used for the control of an at least semiautonomous robot, in this case, an at least semiautonomous motor vehicle 100.

Sensor 30, for instance, may be a video sensor, which is preferably disposed in motor vehicle 100.

Artificial neural network 60 is designed to reliably identify objects from input images x.

Actuator 10, which is preferably situated in motor vehicle 100, may be a brake, a drive or a steering system of motor vehicle 100, for example. Actuation signal A may then be determined in such a way that actuator or actuators 10 is/are actuated in such a manner, for instance, that motor vehicle 100 prevents a collision with the objects reliably identified by artificial neural network 60, in particular when they involve certain classes such as pedestrians.

Alternatively, the at least semiautonomous robot may also be a different mobile robot (not shown), such as a robot which moves by flying, swimming, diving or walking. For example, the mobile robot may be an at least semiautonomous lawnmower or an at least semiautonomous cleaning robot. In these cases, as well, actuation signal A is able to be ascertained in such a way, for instance, that the drive and/or the steering system of the mobile robot is/are actuated so that the at least semiautonomous robot prevents a collision with objects identified by artificial neural network 60.

Alternatively or additionally, display unit 10a is able to be actuated by actuation signal A and the ascertained safe regions be displayed, for instance. In addition, for example, in a motor vehicle 100 having a non-automated steering system it is possible that display unit 10a is actuated by actuation signal A such that it outputs an optical or acoustic warning signal if it is ascertained that motor vehicle 100 is at risk of colliding with one of the reliably identified objects.

Figure 3:
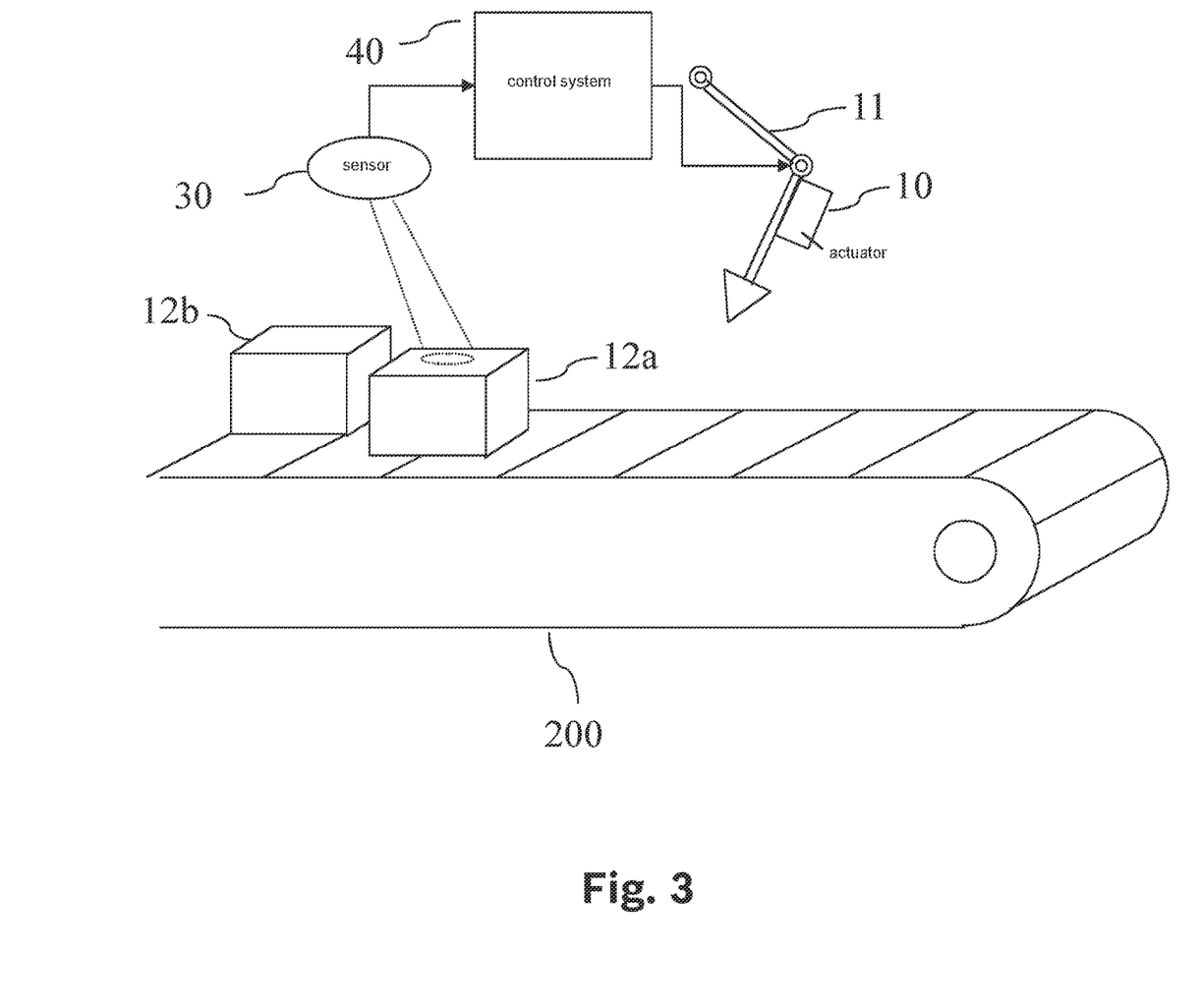
FIG. 3 shows schematically, an exemplary embodiment for the control of a production system.

FIG. 3 shows an exemplary embodiment in which control system 40 is used for actuating a production machine 11 of a production system 200 by actuating an actuator 10 that controls this production machine 11. Production machine 11 may be a machine for punching, sawing, drilling and/or cutting, for instance.

Sensor 30, for example, may then be an optical sensor which detects properties of manufactured products 12a, 12b. It may be that these manufactured products 12a, 12b are movable. It is possible that actuator 10 which controls production machine 11 is actuated as a function of an assignment of the detected manufactured products 12a, 12b, so that production machine 11 appropriately carries out a subsequent processing step of the correct ones of manufactured products 12a, 12b. It is also possible that through the identification of the correct properties of the same ones of manufactured products 12a, 12b (i.e., without an incorrect assignment), production machine 11 appropriately adapts the same production step for the processing of a subsequent manufactured product.

Figure 4:
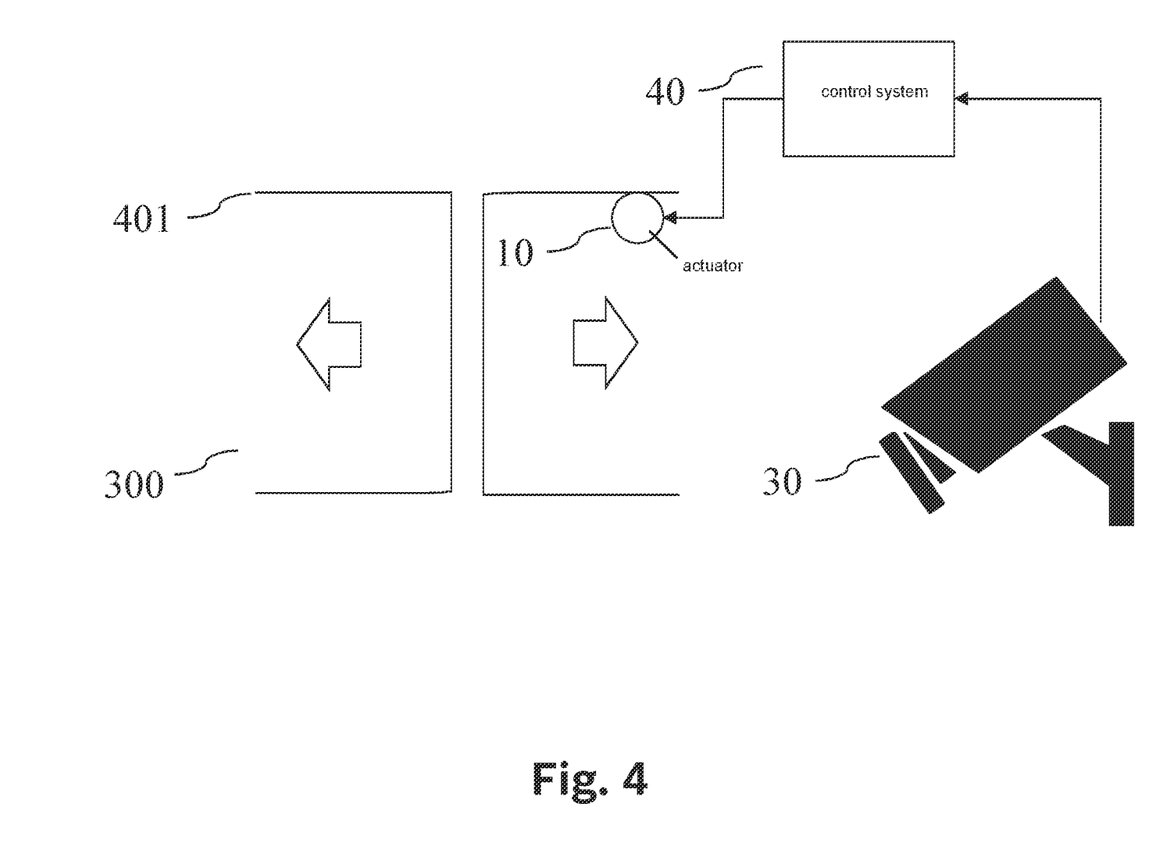
FIG. 4 shows schematically, an exemplary embodiment for the control of an access system.

FIG. 4 shows an exemplary embodiment in which control system 40 is used for controlling an access system 300. Access system 300 may include a physical access control such as a door 401. Video sensor 30 is set up to detect a person. With the aid of object identification system 60, this detected image is able to be interpreted. If multiple persons are detected at the same time, for example, then an assignment of the persons (i.e., the objects) to one another makes it possible to ascertain the identity of the persons in an especially reliable manner such as by analyzing their movements. Actuator 10 may be a lock that releases or blocks the release of the access control, e.g., door 401, as a function of actuation signal A. To this end, actuation signal A may be selected as a function of the interpretation by object identification system 60, e.g., as a function of the ascertained identity of the person. Instead of the physical access control, a logical access control may be provided as well.

Figure 5:
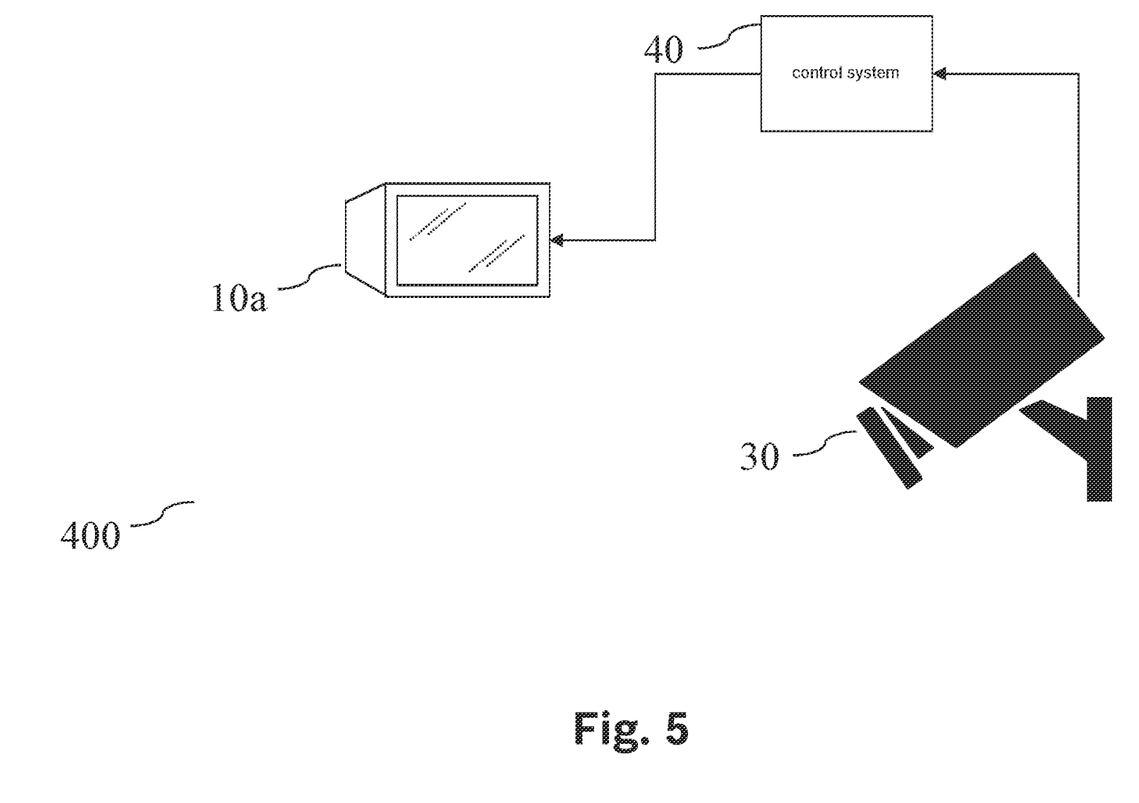
FIG. 5 shows schematically, an exemplary embodiment for the control of a monitoring system.

FIG. 5 shows an exemplary embodiment in which control system 40 is used for the control of a monitoring system 400. This exemplary embodiment differs from the exemplary embodiment shown in FIG. 5 in that instead of actuator 10, display unit 10a is provided, which is actuated by control system 40.

For example, an identity of the objects recorded by video sensor 30 is able to be ascertained in a reliable manner by artificial neural network 60, for instance in order to infer which ones are suspicious as a function thereof, and then to select actuation signal A in such a way that display unit 10a displays this object in a color-coded, highlighted manner.

Figure 6:
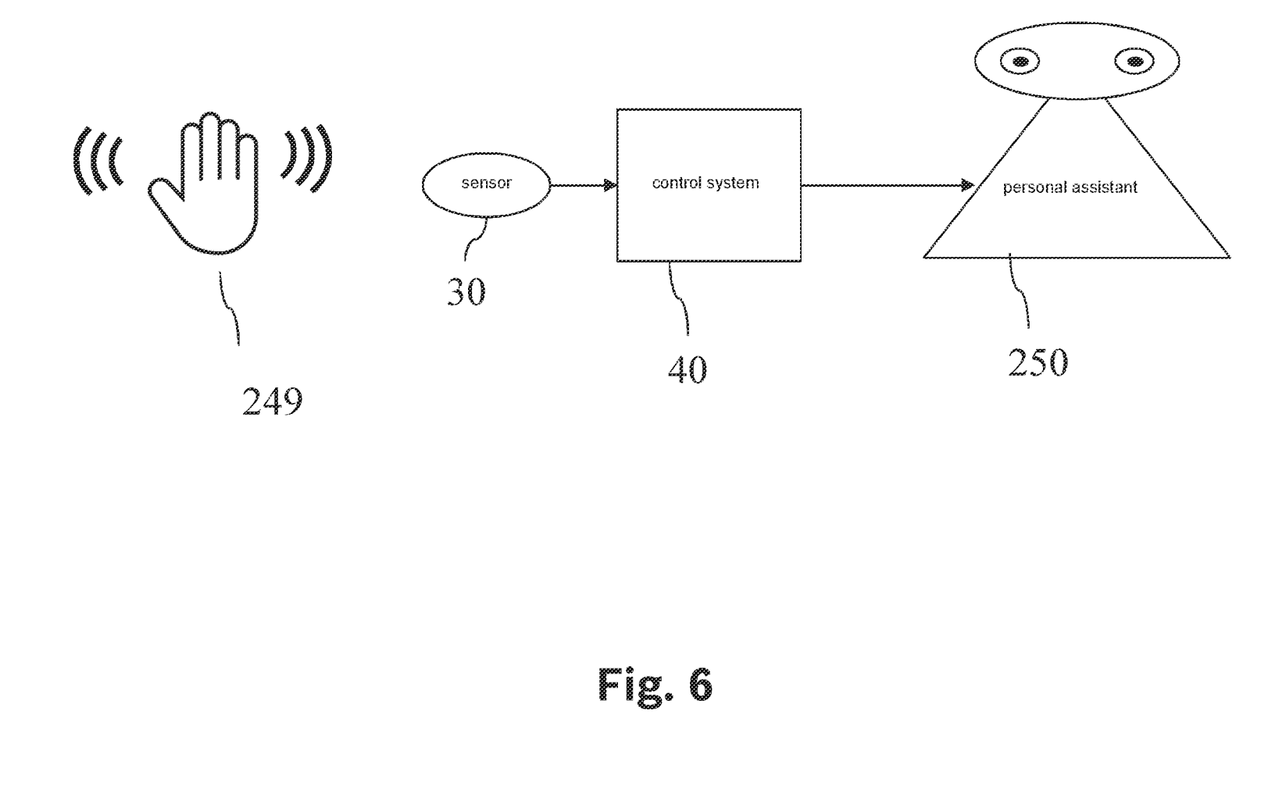
FIG. 6 shows schematically, an exemplary embodiment for the control of a personal assistant.

FIG. 6 shows an exemplary embodiment in which control system 40 is used for the control of a personal assistant 250. Sensor 30 is preferably an optical sensor which receives images of a gesture of a user 249.

Depending on the signals of sensor 30, control system 40 ascertains an actuation signal A of personal assistant 250, for instance in that the neural network carries out a gesture detection. This ascertained actuation signal A then is conveyed to personal assistant 250, which will then be actuated accordingly. This ascertained actuation signal A may particularly be selected so that it corresponds to an assumed desired actuation by user 249. This assumed desired actuation is able to be ascertained as a function of the gesture identified by artificial neural network 60. Control system 40 then may select control signal A for transmittal to personal assistant 250 as a function of the assumed desired actuation, and/or select actuation signal A for transmittal to the personal assistant according to the assumed desired actuation 250.

For example, this corresponding actuation may include that personal assistant 250 calls up information from a database and reproduces it in a manner that user 249 can receive.

Instead of personal assistant 250, a household appliance (not shown), especially a washing machine, a stove, an oven, a microwave unit or a dishwasher, may also be provided for a corresponding actuation.

Figure 7:
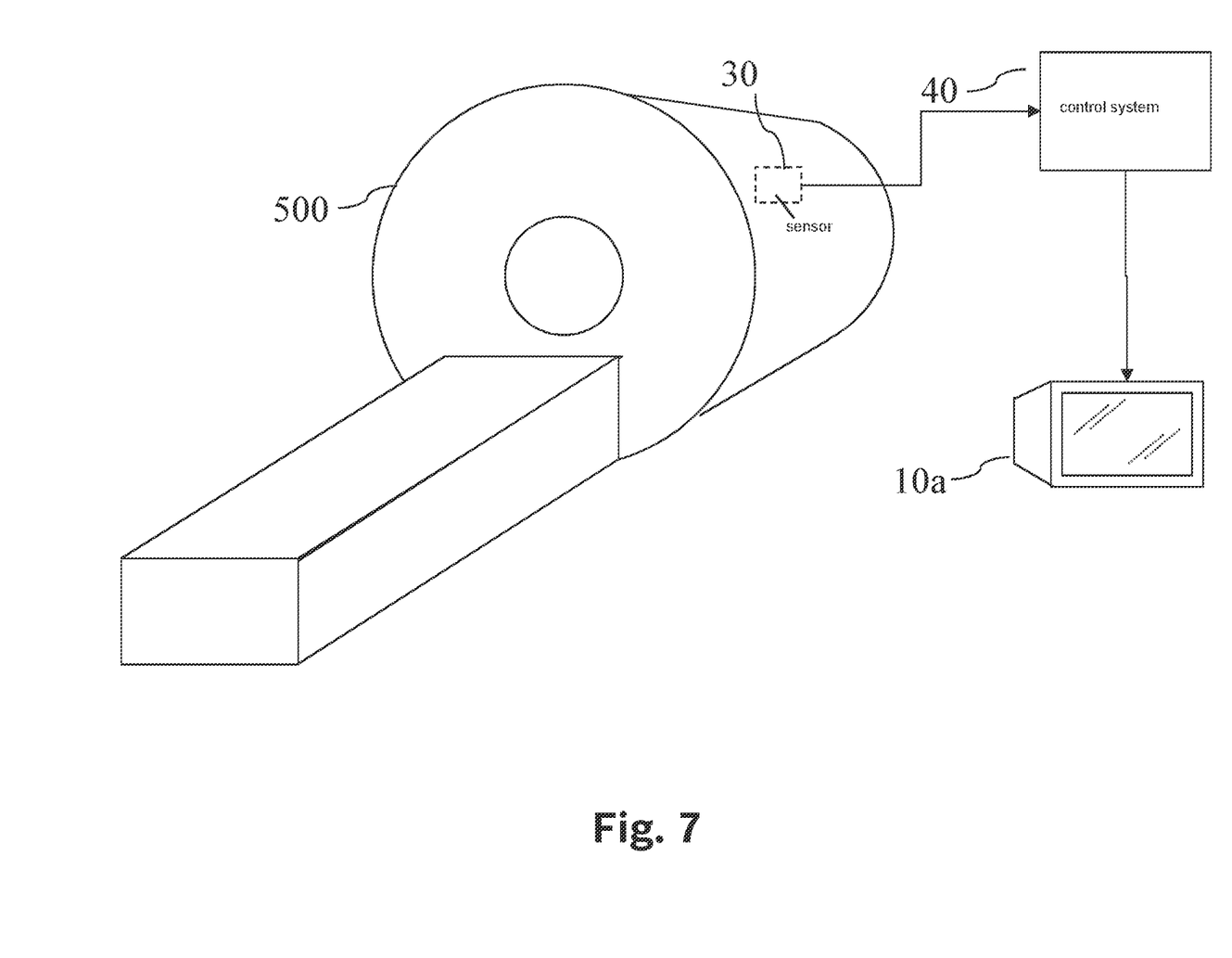
FIG. 7 shows schematically, an exemplary embodiment for the control of a medical imaging system.

FIG. 7 shows an exemplary embodiment in which control system 40 is used for the control of a medical imaging system 500 such as an MRI, X-ray or ultrasonic device. Sensor 30, for instance, may be present in the form of an imaging sensor, and display unit 10a is actuated by control system 40. For example, neural network 60 is able to ascertain whether a region recorded by the imaging sensor is abnormal, and actuation signal A then may be selected so that display unit 10a displays this region highlighted in color.

Figure 8:
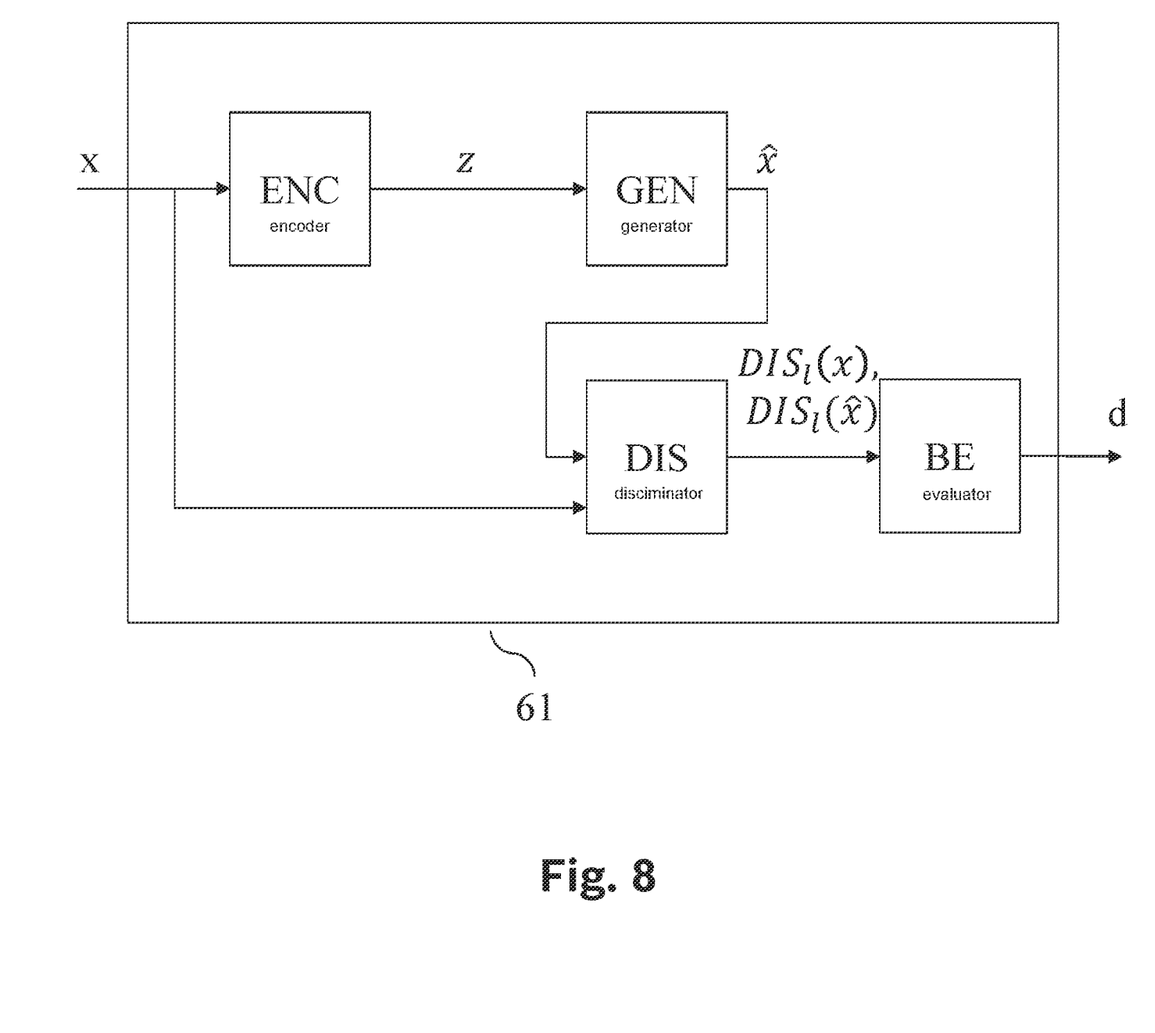
FIG. 8 shows a possible structure of the monitoring unit.

FIG. 8 shows a possible structure of monitoring unit 61. Input image x is conveyed to an encoder ENC, which uses it to ascertain what is known as a latent variable z. Latent variable z has a smaller dimensionality than input image x. This latent variable z is conveyed to a generator GEN, which generates a reconstructed image $\hat{x}$ therefrom. In the exemplary embodiment, encoder ENC and generator GEN are provided in the form of a convolutional neural network in each case. Input image x and reconstructed image $\hat{x}$ are conveyed to a discriminator DIS. Discriminator DIS was trained to generate the best possible variable that characterizes whether an image conveyed to discriminator DIS is a real image or whether it was generated by generator GEN.

This will be described in greater detail in the further text in connection with FIG. 10. Generator GEN also is a convolutional neural network.

Feature maps of an $l^{th}$ layer (l being a predefined number), which result when input image x and reconstructed image $\hat{x}$ are conveyed to generator GEN, are denoted by $DIS_l(x)$ and $DIS_l(\hat{x})$ respectively. They are conveyed to an evaluator BE in which for example a reconstruction error $E_x = \|DIS_l(\hat{x}) - DIS_l(x)\|_2$. In an alternative embodiment (not shown), it is also possible to select the reconstruction error while circumventing discriminator DIS as $E_x = \|x - \hat{x}\|_2$.

Next, an anomaly value A(x) is able to be ascertained as the share of the particular input images of a reference dataset (e.g., a training dataset based on which discriminator DIS and/or generator GEN and/or encoder ENC were trained), whose reconstruction error is smaller than ascertained reconstruction error $E_x$. If anomaly error A(x) is greater than a predefined threshold value, then monitoring signal d is set to the value d=1, which signals that output variables y are potentially ascertained unreliably. In the other case, monitoring signal d is set to the value d=0, which signals that the ascertainment of output variables y is classified as reliable.

Figure 9:
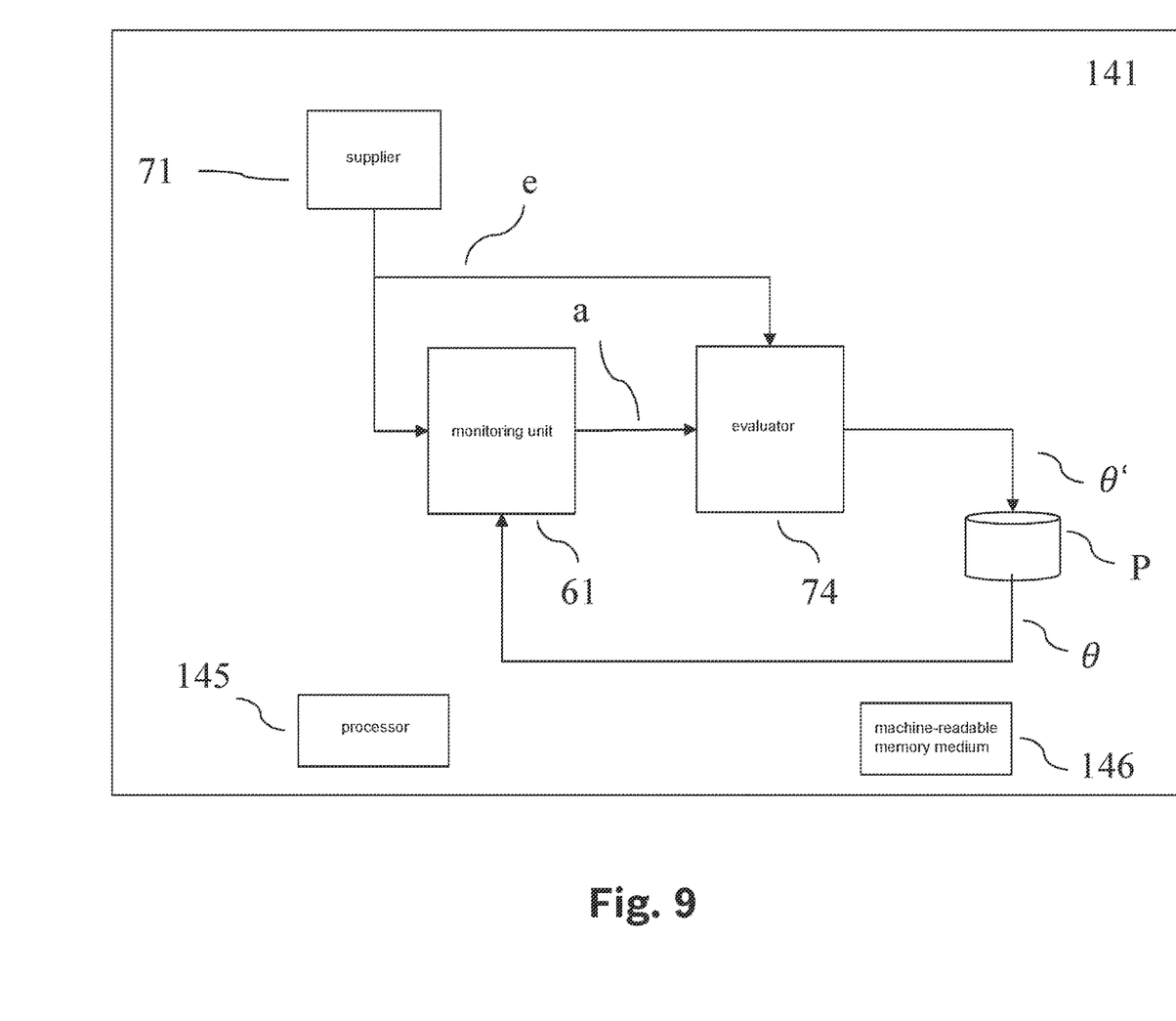
FIG. 9 shows a possible structure of a first training device 141.

FIG. 9 shows a possible structure of a first training device 141 for training monitoring unit 51. It is parameterized by parameters θ, which are supplied by parameter memory P. Parameters θ include generator parameters $\theta_{GEN}$, which parameterize generator GEN, encoding parameters $\theta_{ENC}$, which parameterize encoder ENC, and discriminator parameters $\theta_{DIS}$, which parameterize discriminator DIS.

Training device 141 includes a supplier 71, which supplies input images e from a training dataset. Input images e are conveyed to monitoring unit 61 to be trained, which uses them for ascertaining output variables a. Output variables a and input images e are conveyed to an evaluator 74, which ascertains new parameters θ' therefrom, as described in connection with FIG. 10, which are transmitted to parameter memory P where they replace parameters θ.

The methods executed by training device 141 are able to be implemented as a computer program on a machine-readable memory medium 146 and be carried out by a processor 145.

Figure 10:
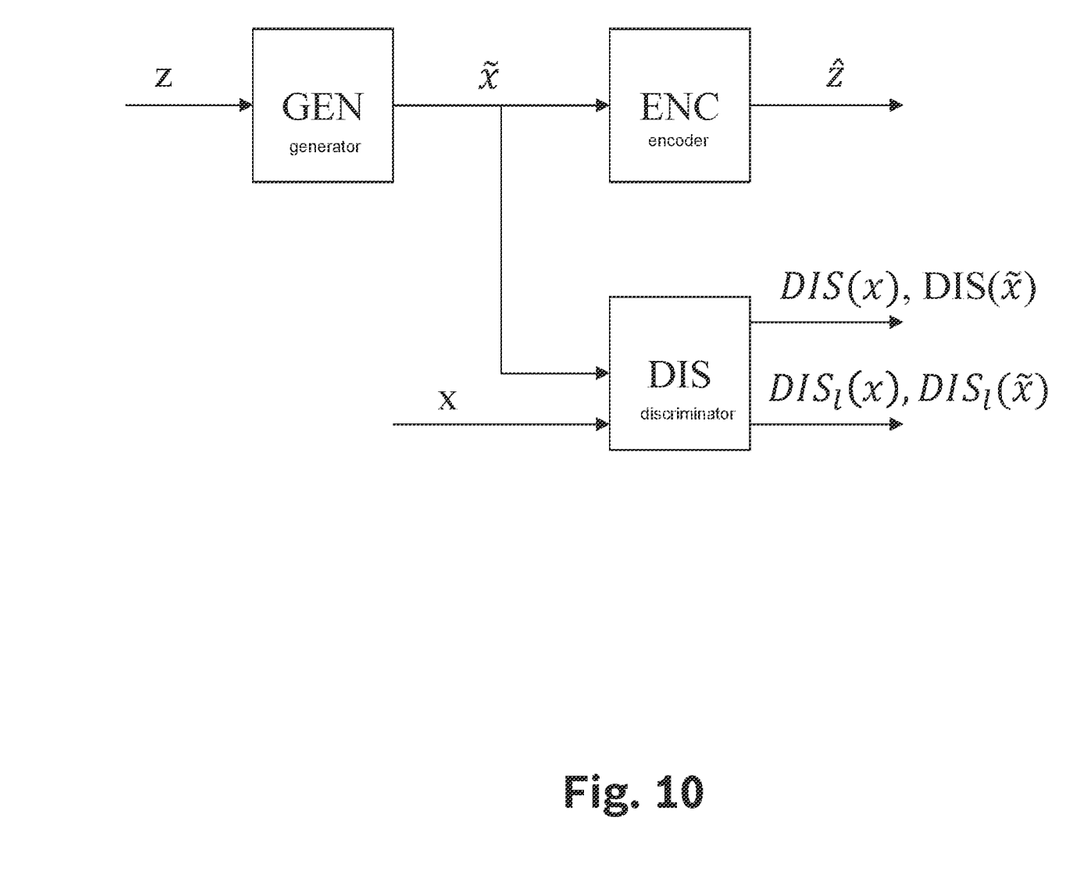
FIG. 10 shows the neural network system.

FIG. 10 illustrates the interaction between generator GEN, encoder ENC and discriminator DIS during the training. The illustrated system of generator GEN, encoder ENC and discriminator DIS depicted here is also denoted as a neural network system in this document.

To begin with, discriminator DIS is trained. For instance, the following steps for training discriminator DIS may be repeated $n_{DI}$ times, $n_{DIS}$ being a predefined whole number.

First, a batch of real input images x is made available. They are denoted by $\{x^{(i)}\}_{i=1}^{m} \sim p_x(x)$ with a (generally unknown) probability distribution $p_x$. These input images $x^{(i)}$ are real images, which are supplied by a database, for instance. The totality of these input images is also referred to as a training dataset.

In addition, a batch of latent variables z as $\{z^{(i)}\}_{i=1}^{m} \sim p_z(z)$ is supplied, which were randomly drawn from a probability distribution $p_z$. Probability distribution $p_z$ is a (multidimensional) standard normal distribution in this case.

Moreover, a batch of random variables is supplied as $\{\in^{(i)}\}_{i=1}^{m} \sim p_\in(z)$, which were randomly drawn from a probability distribution $p_\in$. Probability distribution $p_\in$ is an equal distribution over the interval [0; 1], for instance.

Latent variables z are forwarded to generator GEN and provide a constructed input image $\tilde{x}$, i.e., $$\tilde{x}^{(i)} \leftarrow GEN(z^{(i)}).$$

Using random variable ∈, an interpolation is carried out between input image x and constructed input image $\tilde{x}$, i.e., $$x_{int}^{(i)} \leftarrow \in x^{(i)} + (1 - \in)\tilde{x}^{(i)}.$$

Using a predefined gradient coefficient λ, which may be selected as λ=10, for example, a discriminator cost function $$\mathcal{L}_{DIS}^{(i)} \leftarrow DIS(\tilde{x}^{(i)}) - DIS(x^{(i)}) + \lambda(|\nabla_{x_{int}} DIS(x_{int}^{(i)})|_2 - 1)$$

then is ascertained. New discriminator parameters $\theta_{DIS}'$ may be ascertained therefrom as $$\theta_{DIS}' = Adam\left(\nabla_{\theta_{DIS}} \frac{1}{m}\Sigma_{i=1}^{m} \mathcal{L}_{DIS}^{(i)}\right),$$

"Adam" representing a gradient descent method. This ends this training of discriminator DIS.

Next, generator GEN and encoder ENC are trained. Here, too, real input images $\{x^{(i)}\}_{i=1}^{m} \sim p_x(x)$ and randomly selected latent variables $\{z^{(i)}\}_{i=1}^{m} \sim p_z(z)$ are made available. Once again, $$\tilde{x}^{(i)} \leftarrow GEN(z^{(i)})$$

is ascertained. It is used for ascertaining a reconstructed latent variable $\hat{z}$ in that constructed image d $\hat{x}$ is conveyed to encoder ENC, i.e., $$\hat{z}^{(i)} \leftarrow ENC(\tilde{x}^{(i)}).$$

As illustrated in FIG. 8, an attempt is also made to reconstruct input image x with the aid of encoder ENC and generator GEN, i.e., $$\hat{x}^{(i)} \leftarrow GEN(ENC(x^{(i)})).$$

Next, a generator cost function $\mathcal{L}_{GEN}^{(i)}$, a reconstruction cost function $\mathcal{L}_{recon_x}^{(i)}$ of input image x, and a reconstruction cost function $\mathcal{L}_{recon_z}^{(i)}$ of latent variable z are ascertained as $$\mathcal{L}_{GEN}^{(i)} \leftarrow DIS(\tilde{x}^{(i)})$$
$$\mathcal{L}_{recon_x}^{(i)} \leftarrow \|DIS_l(x^{(i)}) - DIS_l(\hat{x}^{(i)})\|_2^2$$
$$\mathcal{L}_{recon_z}^{(i)} \leftarrow \|z^{(i)} - \hat{z}^{(i)}\|_2^2.$$

New generator parameters $\theta_{GEN}'$ and new encoding parameters $\theta_{ENC}'$ then are ascertained as $$\theta'_{GEN} = Adam\left(\nabla_{\theta_{GEN}} \frac{1}{m} \sum_{i=1}^{m} \left(\mathcal{L}_{GEN}^{(i)} + \mathcal{L}_{recon_x}^{(i)}\right)\right)$$

$$\theta'_{ENC} = Adam\left(\nabla_{\theta_{ENC}} \frac{1}{m} \Sigma_{i=1}^{m} L_{recon_z}^{(i)}\right).$$

New generator parameters $\theta_{GEN}'$, new encoding parameters $\theta_{ENC}'$, and new discriminator parameters $\theta_{IS}'$ then replace generator parameters $\theta_{GEN}$, encoding parameters $\theta_{ENC}$ and discriminator parameters $\theta_{DIS}$.

A convergence of parameters θ is able to be checked at this point, and the training of discriminator DIS and/or of generator GEN and encoder ENC may possibly be repeated until a convergence is achieved. That concludes the present method.

Figure 11:
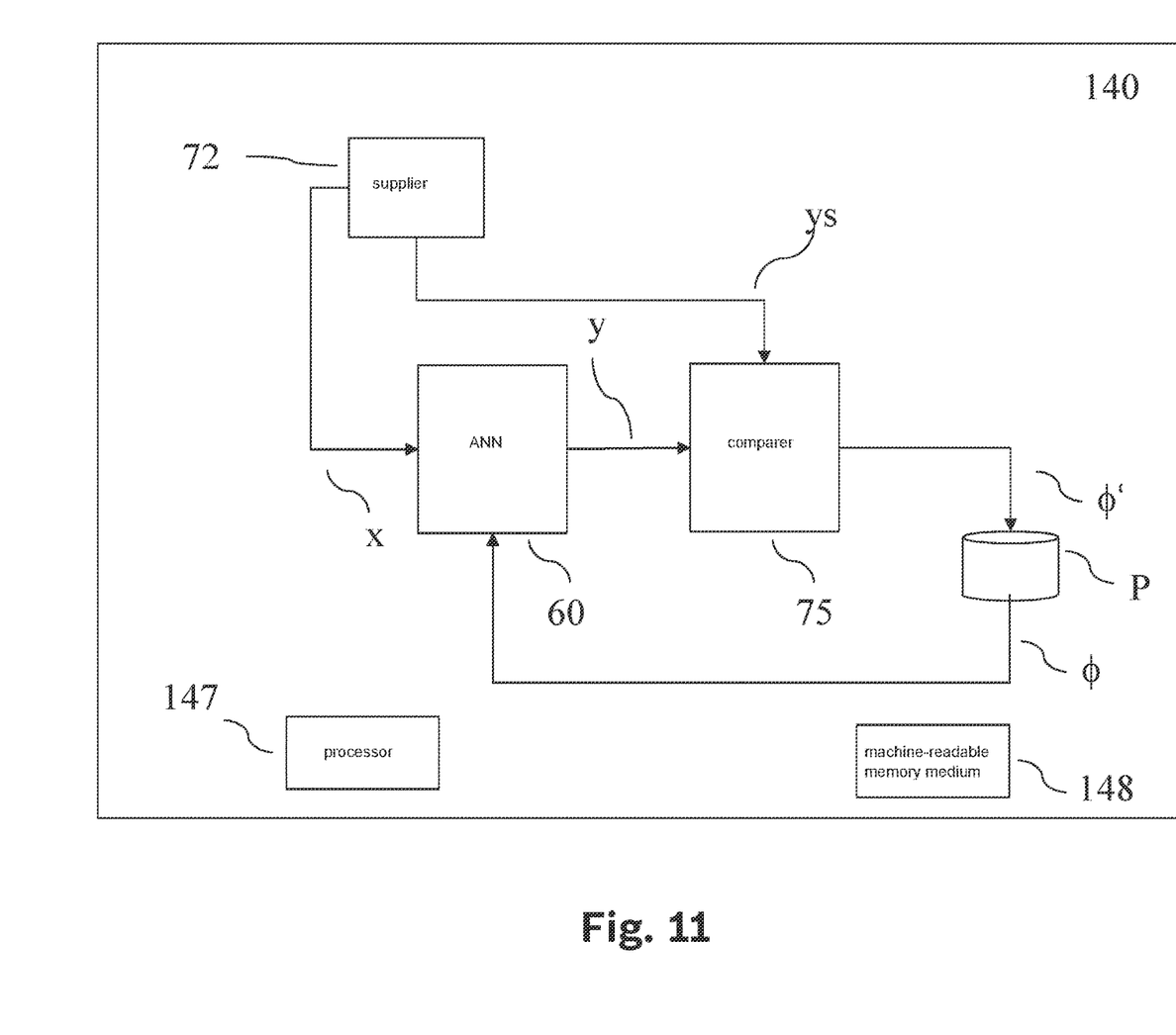
FIG. 11 shows a possible structure of a second training device 140.

FIG. 11 shows an exemplary second training device 140 for training neural network 60. Training device 140 includes a supplier 72, which supplies input images x and setpoint output variables ys, such as setpoint classifications. Input image x is conveyed to artificial neural network 60 to be trained, which uses it to ascertain output variables y. Output variables y and setpoint output variables ys are conveyed to a comparer 75, which ascertains new parameters φ' therefrom as a function of an agreement between respective output variables y and setpoint output variables ys, the new parameters being transmitted to parameter memory P where they replace parameters φ.

The methods executed by training system 140 may be implemented on a machine-readable memory medium 148 as a computer program and executed by a processor 147.

A dataset that includes input images x and associated setpoint output variables ys may be augmented or generated (e.g., by supplier. 72) in the following manner. To begin with, a dataset including input images $x^{(i)}$ is made available. They are classified according to predefined characteristics (denoted as "A" and "B" by way of example) of a feature. For instance, vehicles may be classified according to the feature 'headlights switched on" or 'headlights switched off", or identified cars may be classified according to the type "passenger car" or "station wagon". Also, different characteristics of the feature "hair color" for detected pedestrians are possible. Depending on the particular characteristic of this feature, the input images $x^{(i)}$ are subdivided into two sets, i.e., $I_A\{i|x^{(i)}$ has the characteristic "A"} und $I_B=\{i|x^{(i)}$ has the characteristic "B"}. In an advantageous manner, these sets furthermore are homogenized to the effect that input images $x^{(i)}$ have the same characteristic X for a predefined set of other features, preferably of all other features, that is to say, $$I_A \leftarrow I_A \cap \{i \mid x^{(i)} \text{ has the characteristic } X\}$$

$$I_B \leftarrow I_B \cap \{i \mid x^{(i)} \text{ has the characteristic } X\}.$$

Associated latent variables $z^{(i)}=ENC(x^{(i)})$ are then ascertained for each of input images $x^{(i)}$ with the aid of encoder ENC.

The average values of the latent variables are ascertained across the sets, i.e., $$\bar{z}_A = \frac{1}{|I_A|}\Sigma_{i \in I_A}z^{(i)}, \bar{z}_B = \frac{1}{|I_B|}\Sigma_{i \in I_B}z^{(i)}.$$

Next, the differences of the average values are formed, i.e., $$v_{A-B} = \bar{z}_B - \bar{z}_A.$$

New latent variables now are formed for images of set $I_A$ using a predefined scale factor α, which may assume values between 0 and 1, for instance, $$z_{new}^{(i)} = z^{(i)} + \alpha * v_{A-B}, i \in I_A.$$

Accordingly, new latent variables are able to be formed for images from the set $I_B$ as $$z_{new}^{(i)} = z^{(i)} - \alpha * v_{A-B}, i \in I_B.$$

From this, new images $x_{new}^{(i)}$ are able to be generated by $$x_{new}^{(i)} \leftarrow ENC(z_{new}^{(i)}).$$

It is of course not necessary to classify whole images. It is possible that a detection algorithm is used for classifying image sections as objects, for example, that these image sections then are cut out, a new image section (according to new image $x_{new}^{(i)}$) is generated, as the case may be, and inserted into the associated image in place of the cut-out image section. For example, this makes it possible to selectively adapt the hair color of a pedestrian in an image featuring a detected pedestrian.

With the exception of the classification of the feature varied in this way between characteristic "A" and "B", associated setpoint output variable ys may be adopted in unchanged form. In this way, the augmented dataset is able to be created and neural network 60 be trained with this augmented dataset. The methods then ends.

The term 'computer' encompasses various devices for processing predefined processing rules. These processing rules may be present in the form of software or in the form of hardware or also in a mixed form of software and hardware.

The invention claimed is:

1. A method for training a machine learning system, comprising:
   generating an augmented dataset which includes input images for training the machine learning system, which is configured for classification and/or semantic segmentation of input images, using a first machine learning system, which is embodied as a decoder of an autoencoder, and a second machine learning system which is embodied as an encoder of the autoencoder, the first machine learning system being a first neural network and the second machine learning system being a second neural network, the generating of the augmented data set including:
      ascertaining latent variables from the input images using the encoder;
      classifying the input images as a function of ascertained feature characteristics of image data of the input images; and ascertaining an augmented input image of the augmented dataset from at least one of the input images as a function of average values of the ascertained latent variables in at least two image classes, the image classes being selected so that the input images classified in the image classes agree in their characteristics in a predefined set of other features, wherein the augmented input image is ascertained using the decoder as a function of an ascertained augmented latent variable, and wherein the ascertained augmented latent variable is ascertained from a predefined one of the ascertained latent variables and a difference of the average values.

2. The method as recited in claim 1, wherein the difference is weighted by a predefined weighting factor.

3. The method as recited in claim 1, further comprising:
checking, using the generated augmented dataset, as to whether the machine learning system satisfies a requirement, and as a function of the check, the training is continued when the check has revealed that the machine learning system does not satisfy the requirement.

4. The method as recited in claim 1, wherein the machine learning system is trained by the generated augmented dataset when a monitoring of the machine learning system has revealed that the machine learning system does not satisfy the requirement.

5. The method as recited in claim 4, wherein the monitoring of the machine learning system is carried out using a monitoring unit, which includes the first machine learning system and the second machine learning system, and an input image of the input images is conveyed to the second machine learning system, which uses the input image to ascertain a low-dimensional latent variable, from which the first machine learning system ascertains a reconstruction of the input image, and a decision as to whether or not the machine learning system satisfies a requirement is made as a function of the input image and the reconstructed input image.

6. The method as recited in claim 5, wherein the monitoring unit also has a third machine learning system of a neural network system, the neural network system including the first machine learning system, the second machine learning system, and a third machine learning system, the third machine learning system being a third neural network, and the first machine learning system is configured to ascertain from a predefined, low-dimensional latent variable a higher-dimensional, constructed image, and the second machine learning system is configured to ascertain the latent variable again from the higher-dimensional, constructed image, and the third machine learning system is configured to distinguish whether or not an image that it has received is a real image, and as a function thereof, a decision is made as to whether or not the machine learning system satisfies a requirement, which value an activation in a predefined feature map of the third machine learning assumes when it receives the input image, and which value the activation in the predefined feature map of the third machine learning system assumes when it receives the reconstructed input image.

7. The method as recited in claim 6, wherein the first machine learning system is trained so that an activation in the predefined feature map of feature maps of the third machine learning system assumes the same value when it receives a real image or an image of the real image that is reconstructed from a series connection made up of a second machine learning system and a first machine learning system.

8. The method as recited in claim 7, wherein the first machine learning system is trained so that the third machine learning system does not recognize that an image it receives that was generated by the first machine learning system is not a real image.

9. The method as recited in claim 7, wherein the second machine learning system is trained so that a reconstruction of a latent variable ascertained by a series connection made up of the first machine learning system and the second machine learning system is within a range of the latent variable.

10. The method as recited in claim 7, wherein the third machine learning system is trained to recognize that an image it receives that was generated by the first machine learning system is not a real image.

11. The method as recited in claim 10, wherein the third machine learning system is trained to recognize that a real image it receives is a real image.

12. The method as recited in claim 10, wherein the machine learning system and the neural network system are trained by datasets that include the same input images.

13. A training device configured to train a machine learning system, the training device configured to:
generate an augmented dataset which includes input images for training the machine learning system, which is configured for classification and/or semantic segmentation of input images, using a first machine learning system, which is embodied as a decoder of an autoencoder, and a second machine learning system which is embodied as an encoder of the autoencoder, the first machine learning system being a first neural network and the second machine learning system being a second neural network, to generate the augmented data set, the training device is configured to:
ascertain latent variables from the input images using the encoder;
classify the input images as a function of ascertained feature characteristics of image data of the input images; and
ascertain an augmented input image of the augmented dataset from at least one of the input images as a function of average values of the ascertained latent variables in at least two image classes, the image classes being selected so that the input images classified in the image classes agree in their characteristics in a predefined set of other features, wherein the augmented input image is ascertained using the decoder as a function of an ascertained augmented latent variable, and wherein the ascertained augmented latent variable is ascertained from a predefined one of the ascertained latent variables and a difference of the average values.

14. A non-transitory machine-readable memory medium on which is stored a computer program for training a machine learning system, the computer program, when executed by a computer, causing the computer to perform:
generating an augmented dataset which includes input images for training the machine learning system, which is configured for classification and/or semantic segmentation of input images, using a first machine learning system, which is embodied as a decoder of an autoencoder, and a second machine learning system which is embodied as an encoder of the autoencoder, the first machine learning system being a first neural network and the second machine learning system being a second neural network, the generating of the augmented data set including:

ascertaining latent variables from the input images using the encoder;

classifying the input images as a function of ascertained feature characteristics of image data of the input images; and ascertaining an augmented input image of the augmented dataset from at least one of the input images as a function of average values of the ascertained latent variables in at least two image classes, the image classes being selected so that the input images classified in the image classes agree in their characteristics in a predefined set of other features, wherein the augmented input image is ascertained using the decoder as a function of an ascertained augmented latent variable, and wherein the ascertained augmented latent variable is ascertained from a predefined one of the ascertained latent variables and a difference of the average values.

* * * * *